Oct. 13, 1959

F. O. HESS 2,908,267

FOOD COOKING APPARATUS

Filed May 11, 1954

INVENTOR.
Frederic O. Hess,
BY Paul & Paul
ATTORNEYS.

Oct. 13, 1959  F. O. HESS  2,908,267
FOOD COOKING APPARATUS
Filed May 11, 1954  3 Sheets-Sheet 2
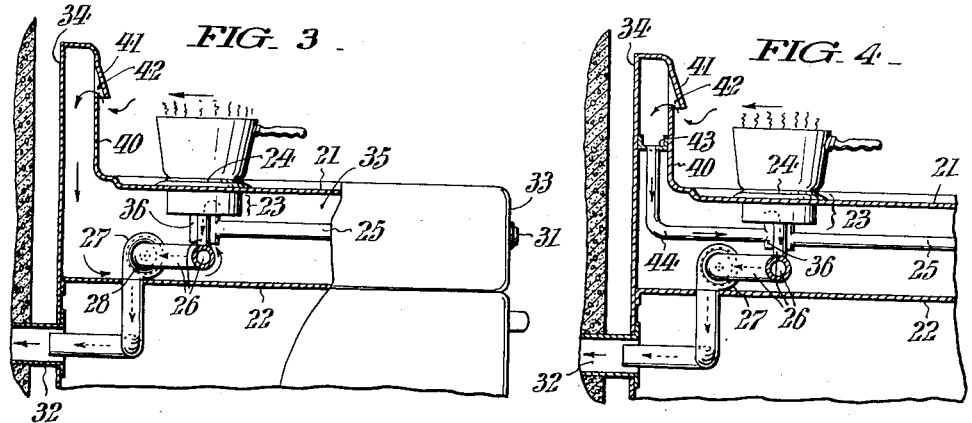
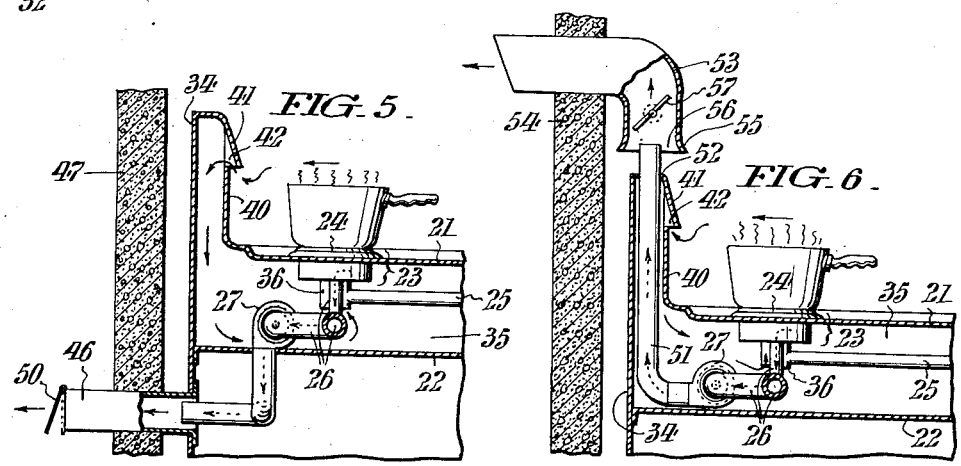
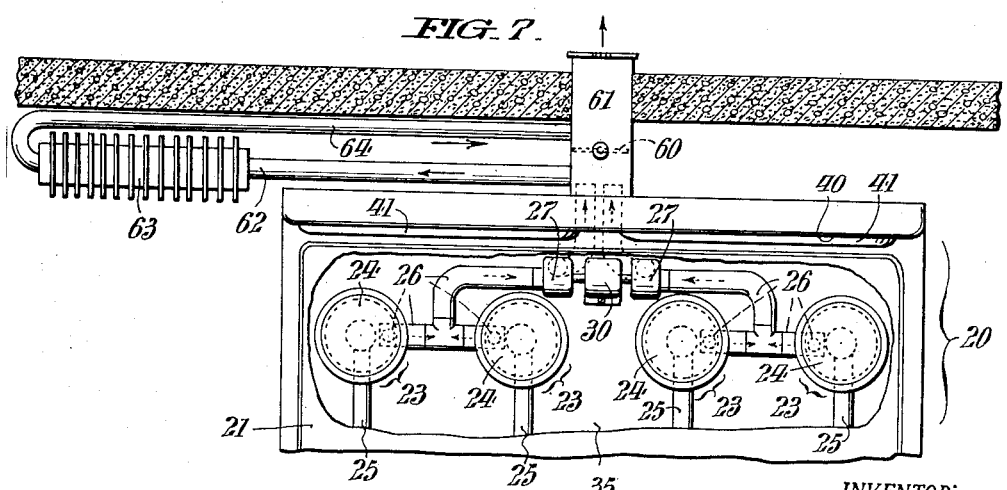

Oct. 13, 1959   F. O. HESS   2,908,267
FOOD COOKING APPARATUS
Filed May 11, 1954   3 Sheets-Sheet 3
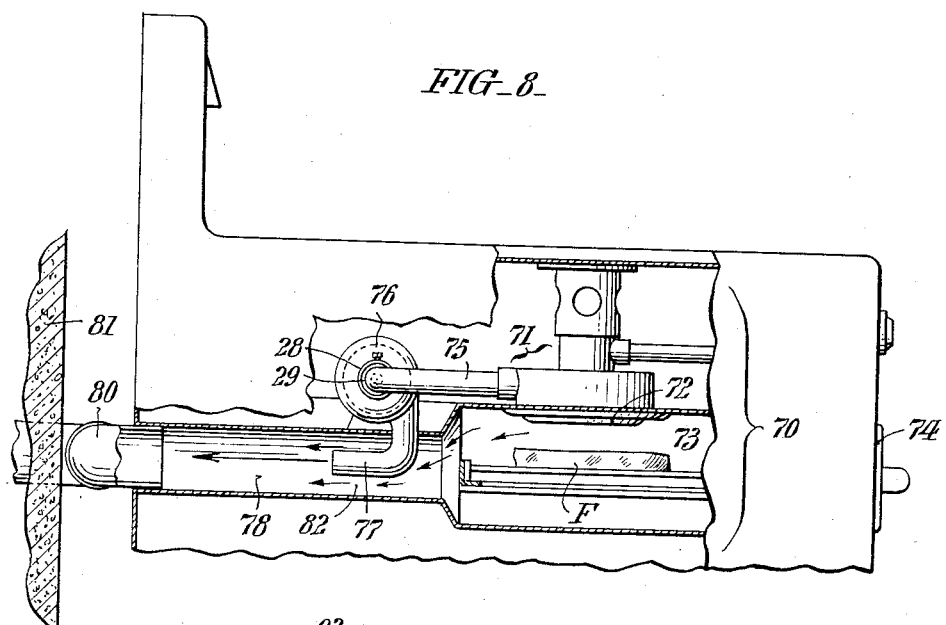
FIG_8_
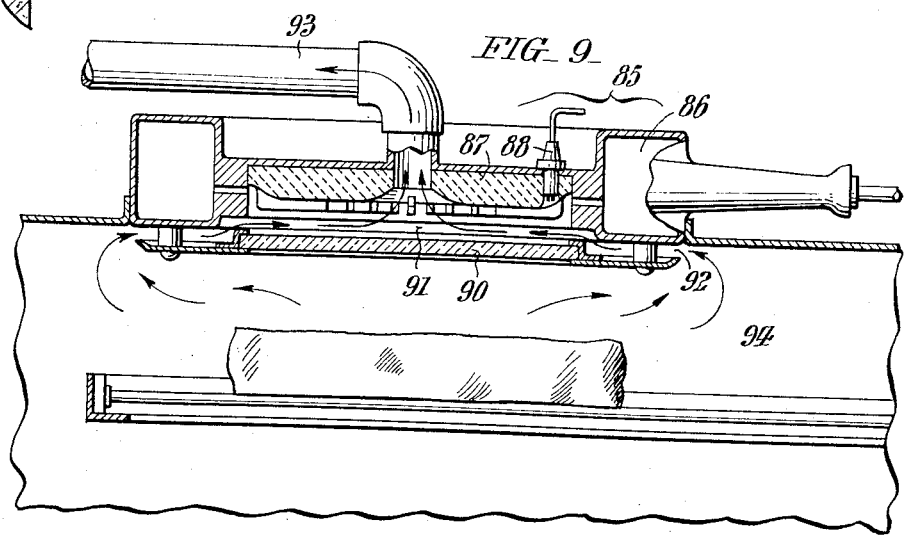
FIG_9_
INVENTOR:
Frederic O. Hess,
BY
Paul & Paul
ATTORNEYS.

United States Patent Office 2,908,267
Patented Oct. 13, 1959

2,908,267
FOOD COOKING APPARATUS

Frederic O. Hess, Philadelphia, Pa., assignor to Selas Corporation of America, Philadelphia, Pa., a corporation of Pennsylvania Application May 11, 1954, Serial No. 429,078

1 Claim. (Cl. 126—299)

This invention relates to a cooking means, and more specifically concerns a radiant heat cooking apparatus which utilizes gas as its fuel. More specifically, the invention concerns an automatically ventilated radiant heat gas range, broiler, or the like, which embodies one or more gas burners of the type disclosed and described in the pending patent application of John Roger Williams, Serial No. 418,858 filed March 26, 1954, now Patent No. 2,870,829, which is assigned to the assignee of the present application.

Conventional gas ranges which discharge their combustion products into the kitchen not only increase the carbon dioxide content of the air in the kitchen but its moisture content as well. Additionally, water vapor from from hot foods as well as grease, smoke or decomposition products from the food itself contaminate the air in the kitchen. It is an object of this invention to overcome the foregoing disadvantages.

More specifically, it is an object of this invention to provide a food cooking apparatus for kitchen use including a fuel burning apparatus wherein the products of combustion of the fuel are not discharged into the kitchen. Another object of this invention is to provide a food cooking apparatus such as gas range, broiler or the like having automatic means for ventilating the cooking or working area of the apparatus to remove and dispose of the air which contains excessive moisture or substances having cooking odors, etc.

For many years, hoods having exhaust fans or blowers have been utilized to ventilate kitchens. In ordinary use, such hoods are rapidly coated with grease-smoke residues, and grease rapidly builds up by impingement on the whirling blades of the fan. Not only is this condition unsanitary, but the accumulation of grease near the electric motor of the fan creates a fire hazard. It is accordingly another object of this invention to provide a ventilating means for handling grease laden air including a fan or blower wherein the grease and similar substances are eliminated from the air before the air contacts the fan or blower. Still another object of this invention is to provide a food cooking apparatus having a radiant heat gas burner including means for drawing the combustion-supporting air from the cooking or working area of the cooking apparatus whereby the objectional substances present in the air are incinerated in the combustion process.

The patent to Schaefer No. 2,674,991 discloses a kitchen range including a telescopic ventilator tube which extends through the work surface of the range. A blower is provided for drawing air into the ventilator tube, and the contaminated air is filtered before it reaches the blower. The filter traps greases, etc., and must be periodically cleaned. Additionally, separate manipulative steps are involved in raising the telescopic ventilator tube, starting the blower, and starting the range burner.

It is accordingly a further object to provide a food cooking apparatus including a blower-operated ventilating means wherein contaminating substances are removed from the air before the air reaches the blower, and wherein the removing means does not require cleaning or any comparable periodic maintenance. It is another object of this invention to provide an apparatus of this type wherein the ventilating means is an integral part of the food cooking apparatus, and which is automatically operative whenever the food cooking means is turned on. Other objects and advantages of this invention, including the simplicity and economy of the same, and the ease with which it may be incorporated into cooking apparatus of various types, will further become apparent hereinafter and in the drawings, whereof:

Fig. 3 represents a sectional view taken as indicated by the lines and arrows III—III which appear in Fig. 1;

Figs. 4, 5 and 6 represent sectional views similar to Fig. 3, illustrating modified forms of the invention;

Fig. 7 represents a plan view similar to Fig. 1, illustrating another modified form of the invention;

Fig. 8 represents a side elevation comparable to Figs. 3–6 illustrating a broiler which comprises another modified form of this invention; and Fig. 9 represents a similar view showing a modified form of broiler embodying features of this invention.

Figure 1:
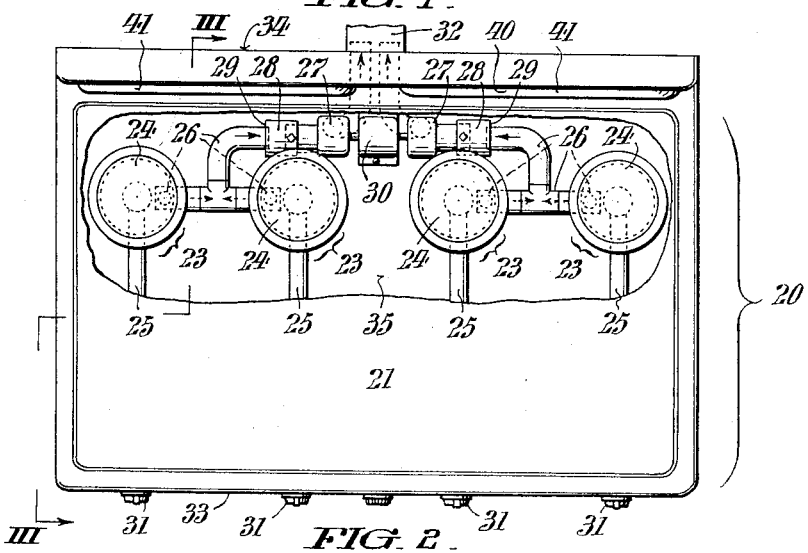
Fig. 1 represents a plan view of a kitchen range embodying features of this invention.
Figure 2:
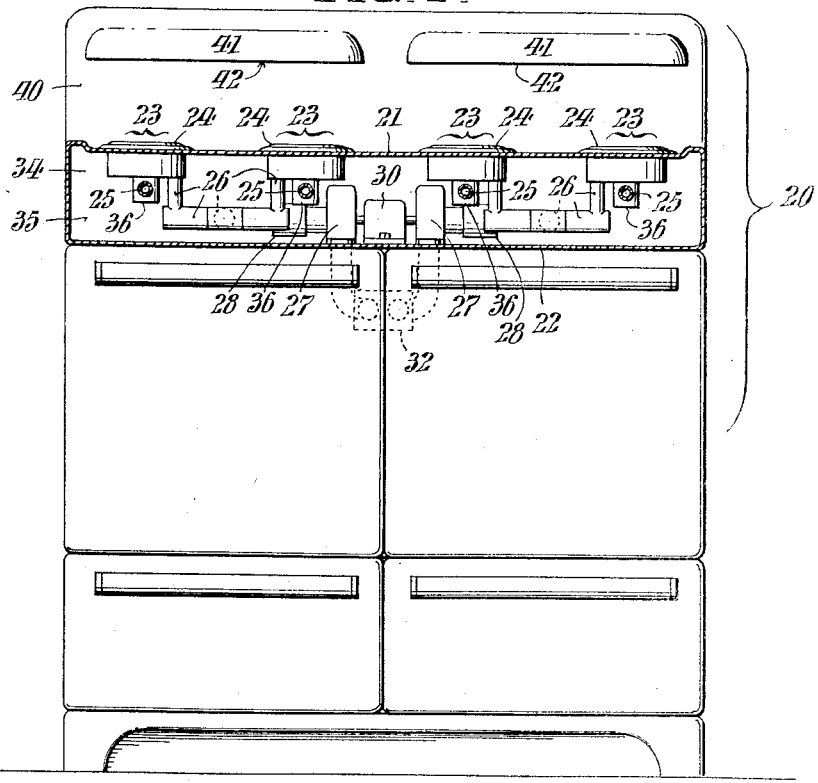
Fig. 2 represents a front elevation of the range shown in Fig. 1, with the upper portion broken away and shown in section in order more clearly to illustrate important details.

Turning now to Figs. 1–3 of the drawings, the number 20 designates comprehensively a kitchen range having a substantially flat top 21 comprising the working surface of the range. Spaced below the top 21 is a deck 22 on which are supported a plurality of radiant heat burners 23. The burners 23 are preferably substantially identical to the burner disclosed in the aforementioned application of John Roger Williams, Serial No. 418,858, filed March 26, 1954, the disclosure of which is incorporated herein by reference. Each burner 23 has a cover 24 which is preferably a transparent plate and which coacts with the other parts of the burner to form a combustion space therein. Gas is fed to the combustion space through pipes 25, and the combustion products are withdrawn from the combustion space through exhaust pipes 26 by means of exhaust blowers 27 which are operated by an electric motor 30. The exhaust pipes 26 are of smaller diameter than the blower inlets, which carry longitudinally adjustable sleeves 28 having open ends which are spaced outwardly of the ends of pipes 26. An annular space 29 is thereby provided, through which air is drawn, cooling the combustion products and preventing damage to the blower 27. Additionally, by adjusting the sleeves longitudinally, the relative quantity of air introduced into the burners is varied, and the air-gas mixture is thereby adjusted.

Each burner is individually controlled by a conventional knob 31 which is connected to admit gas to the burner and concurrently to start the electric motor 30 which operates the exhaust blowers 27. The knob 31 also controls an automatic pilot. The foregoing features are not specifically shown in the drawings inasmuch as they are shown and described in detail in the aforementioned co-pending patent application of John Roger Williams.

The exhaust products from blowers 27 flow out through a duct 32 and may be disposed of outside the kitchen if desired.

Having reference now more specifically to Fig. 3 of the drawings, it will be appreciated that the top 21 and deck 22 are fixed to a front panel 33 and to a back panel 34, forming a substantially enclosed space 35. Each burner has an air inlet tube 36 which opens into the space 35. Accordingly, each burner draws all its combustion supporting air from the space 35, the flow of air into tubes 36 being induced by the suction created by exhaust blowers 27.

Extending above the top 21 along the rear of the range is an upwardly extending ventilating panel 40 which is provided with a plurality of vents 41 having openings 42. Substantially all of the combustion supporting air flows in through the openings 42 of vents 41 since they are the only openings in the substantially enclosed space 35. The air flowing into the vents 41 comes from above and adjacent to the cooking surfaces of the burners, whereby vapors and cooking odors are removed, as indicated by the arrows in Fig. 3 of the drawings, from the cooking or working area of the range. Such substances are drawn into the burner and incinerated in the combustion process.

In the modified form of the invention illustrated in Fig. 4, a plate 43 is fixed between the panels 34, 40, closing off the space between the upper portions of said panels, and a plurality of pipes 44 are provided, one for each burner, each of which is connected directly into the air inlet tube 36 of the corresponding burner. In the embodiment of the invention illustrated in Fig. 4, it is unnecessary to provide an enclosure comparable to the enclosure 35 of Fig. 3, since all the combustion-supporting air is drawn into the burners through pipes 44. This air does not contact the blower or the panels 21, 22.

Fig. 5 shows a modified form of the invention which is somewhat similar to Fig. 3, but the combustion products are blown through a tube 46 which extends outside the wall 47 of the building. A hinged cover 50 is carried at the open end of tube 46.

Fig. 6 of the drawings discloses another modification which is somewhat similar to Fig. 3, but the products of combustion are driven through an exhaust pipe 51 which extends upwardly between the plates 34, 40 through the top 52. A duct 53 is provided adjacent to the open end of exhaust pipe 51. The duct 53 extends through a wall 54 of the kitchen. It will be observed that the duct 53 has an outwardly flared opening 55 of larger diameter than the exhaust pipe 51, providing an intervening annular space 56. The combustion products from exhaust pipe 51, which are propelled into the duct 53 at considerable velocity, inspirate air through the annular space 56. Since the annular space 56 is located above and adjacent to the cooking surfaces of the burners, the cooking area of the range is ventilated by the inspirator action of the tube 51 and duct 53. A balanced damper 57 is provided in the duct 53 which is normally closed but which is opened and maintained in an open position by the flow of combustion products from the exhaust pipe 51.

Fig. 7 discloses a modification wherein a butterfly valve 60 is provided in the exhaust duct 61, and wherein a by-pass line 62 is connected to a heat exchanger 63. A return line 64 extends from the heat exchanger 63 and is connected to duct 61 on the opposite side of valve 60. It will be appreciated that the heat exchanger 63 may be located in the kitchen or in any other room of a house or building to provide heat to that room, utilizing some of the heat contained in the high temperature combustion products.

In Fig. 7 the exhaust pipes 26 are connected directly to the intakes of blowers 27, no means being provided to cool the combustion products before they enter the blowers. The blowers 27 may be made of high-temperature materials, and this arrangement has the advantage that very hot gases are introduced into the heat exchanger 63. However, adjustable sleeves may be provided as shown in Figs. 1–3, if desired, thereby mixing air with the combustion products, permitting the use of less expensive blowers.

Fig. 8 discloses another form of cooking apparatus comprising a broiler 70 having an inverted burner 71 carrying a transparent cover plate 72 at the bottom thereof. The number 73 designates a substantially enclosed space in which the meat or other food F is broiled. The food is inserted into and removed from the space 73 through an opening having a door 74. Or the door 74 may be omitted. The combustion products from the burner flow through a pipe 75 into blower 76 which has a discharge pipe 77 extending into a space 78 which communicates with the broiling space 73. The combustion products are propelled out through the pipe 77 and space 78 through a duct 80 which extends through a wall 81. The space 78 is larger than the pipe 77, whereby an intervening passage 82, is formed. The high velocity flow of combustion products from pipe 77 creates an inspirator effect whereby air is drawn through door 74 or the corresponding opening, through the chamber 73 into the passage 82 and into the space 78. The air mixes with the combustion products in space 78 and the mixture is ultimately disposed of through the duct 80. In this form of the invention it will accordingly be appreciated that means are provided for continuously disposing of smoke and other products which are formed, preventing such products from contaminating the air in the kitchen.

Fig. 9 discloses a broiler similar to the broiler shown in Fig. 8; however, the air from the cooking area is drawn through the burner and the objectionable cooking by-products incinerated. The burner 85 has a gas manifold 86 which introduces gas at the periphery of a refractory bed 87. A cover plate 90 is spaced below the refractory bed 87 forming an intervening combustion space 91. Cover plate 90 is also spaced below the manifold 86 forming an air inlet space 92 through which the combustion supporting air is drawn. A spark plug 88 serves to ignite the gas and air. The blower (not shown) is connected to the exhaust pipe 93 which is centrally located with respect to the combustion space 91. Because of the suction effect of the blower, the smoke and other cooking products from the cooking space 94 are drawn through the inlet space 92 as indicated by the arrows in Fig. 9, and the combustion products are incinerated in the combustion space 91.

Although the construction details of the burners are not particularly illustrated in Figs. 1–8 of the drawings, it will be appreciated that those burners may be constructed as indicated in Fig. 9, and inverted, thereby creating a suction effect around the periphery of the cooking utensil on the burner cover.

It will also be appreciated that other features separately illustrated in the drawings may be combined. For example, the inspirator arrangement of Fig. 6 may be incorporated into any of the devices of Figs. 1–5 and 7–9, and the heat exchanger illustrated in Fig. 7 may be incorporated into the ranges shown in Figs. 1–6 and into the broilers shown in Figs. 7 and 8. Other advantageous combinations and arrangements of the features disclosed will readily become apparent.

It will be understood that this invention is applicable to ovens, deep fat fryers and other cookers in addition to the ranges and broilers specifically disclosed herein. The invention is applicable to food cooking apparatus generally, and has merit and advantages wherever food which is heated produces objectionable substances in the surrounding air.

It will also be appreciated that, although the blower suction is utilized, in the devices shown in the drawings, to induce the flow of combustion supporting air into the combustion space, other means may be provided. If desired, air may be forced into the combustion space under positive pressure, for example, and the combustion products will accordingly be forced out of the combustion space. Also, the structural arrangements of the burners, blowers and ventilating means may be rearranged, and many appropriate arrangements will readily become apparent.

Although I have described my invention by reference to several embodiments thereof, it will be apparent to those skilled in the art that various changes other than those referred to above may be made in the form of the device, that equivalent elements may be substituted for those illustrated in the drawings, and that certain features of the invention may be used to advantage independently of the use of other features, all within the spirit of the invention as defined in the annexed claim.

Having thus described my invention, I claim:

Food cooking apparatus comprising a supporting structure having a substantially closed compartment adjacent to the top thereof, said compartment having a top portion and a top surface, a covered gas burner supported by said structure and substantially flush with said surface and having a lower portion extending into said compartment, said burner including means forming a substantially closed combustion chamber having inlet passage means for supplying gas and air thereto and an exhaust passage, a ventilator having an inlet, means for supporting said ventilator on said apparatus with said inlet located adjacent to said burner and in a position to collect contaminated air resulting from volatile substances produced by the cooking of said food, means forming a duct extending from said exhaust passage through said compartment to the outside of said apparatus, air suction means in said duct, and means forming a passage extending from said ventilator inlet into said compartment and into the inlet passage means of said burner chamber, means in said burner for igniting said gas and air, and motor means to operate said air suction means, whereby the contaminated air is drawn through said ventilator and compartment into said burner combustion chamber and the flame therein and said volatile substances in said contaminated air are incinerated and the combustion products are passed by said suction means through said duct.

References Cited in the file of this patent

UNITED STATES PATENTS

| | | |
|---|---|---|
| 21,084 | Ralston | Aug. 3, 1858 |
| 124,388 | Richardson | Mar. 5, 1872 |
| 356,381 | Shard | Jan. 18, 1887 |
| 1,345,361 | Good | July 6, 1920 |
| 1,347,586 | Mitchell | July 27, 1920 |
| 2,182,106 | Ames | Dec. 5, 1939 |
| 2,184,671 | Hollander | Dec. 26, 1939 |
| 2,287,246 | Hess | June 23, 1942 |
| 2,495,481 | Riehl | Jan. 24, 1950 |
| 2,525,614 | Nelson, et al. | Oct. 10, 1950 |
| 2,586,023 | Gillette | Feb. 19, 1952 |
| 2,762,360 | Knoy | Sept. 11, 1956 |

FOREIGN PATENTS

| | | |
|---|---|---|
| 3,767 | Great Britain | of 1906 |
| 5,441 | Great Britain | of 1895 |